United States Patent [19]

Funahashi

[11] 4,212,839
[45] Jul. 15, 1980

[54] PROCESS FOR PREPARING OPEN-CELL SPONGE RUBBER PRINTING MATERIAL HAVING SMALL AND LARGE INTERCONNECTED CELLS

[76] Inventor: Takaji Funahashi, No. 1, 2-chome, Kitatakasho-machi, Nishi-ku, Nagoya-shi, Aichi-ken, Japan

[21] Appl. No.: 850,452

[22] Filed: Nov. 10, 1977

[30] Foreign Application Priority Data

Nov. 12, 1976 [JP] Japan .................................. 51-136503
Nov. 26, 1976 [JP] Japan .................................. 51-142482

[51] Int. Cl.² ............................................. B29D 27/00
[52] U.S. Cl. .................................. 264/45.3; 101/333; 101/401.1; 264/49; 521/61
[58] Field of Search .................... 264/49, 45.3; 521/61; 101/333, 401.1

[56] References Cited

U.S. PATENT DOCUMENTS

| | | | |
|---|---|---|---|
| 2,175,798 | 10/1939 | Hauser | 264/49 X |
| 2,349,613 | 5/1944 | Chollar | 264/49 X |
| 2,353,877 | 7/1944 | Chollar | 264/49 |
| 2,504,208 | 4/1950 | Locke et al. | 264/49 X |
| 2,537,631 | 1/1951 | Greenup et al. | 264/49 X |
| 2,594,348 | 4/1952 | Rockoff | 264/49 X |
| 3,214,501 | 10/1965 | Strauss | 264/49 |
| 3,342,911 | 9/1967 | Funahashi | 264/49 X |

*Primary Examiner*—Philip Anderson

[57] ABSTRACT

A printing material composed of an open-cell sponge rubber capable of including therein a colored ink, which does not necessitate a stamp pad for the stamping operation, is disclosed. This printing material is prepared by adding appropriate amounts of soluble starch and a fine powder of an easily water-soluble salt which does not decompose or gasify at a curing temperature to a mixture of a starting rubber, a curing agent and a filler, kneading and milling the mixture, introducing the mixture into a mold, heating the mixture to effect curing, removing said starch and salt by washing, and drying the resulting product.

3 Claims, 7 Drawing Figures

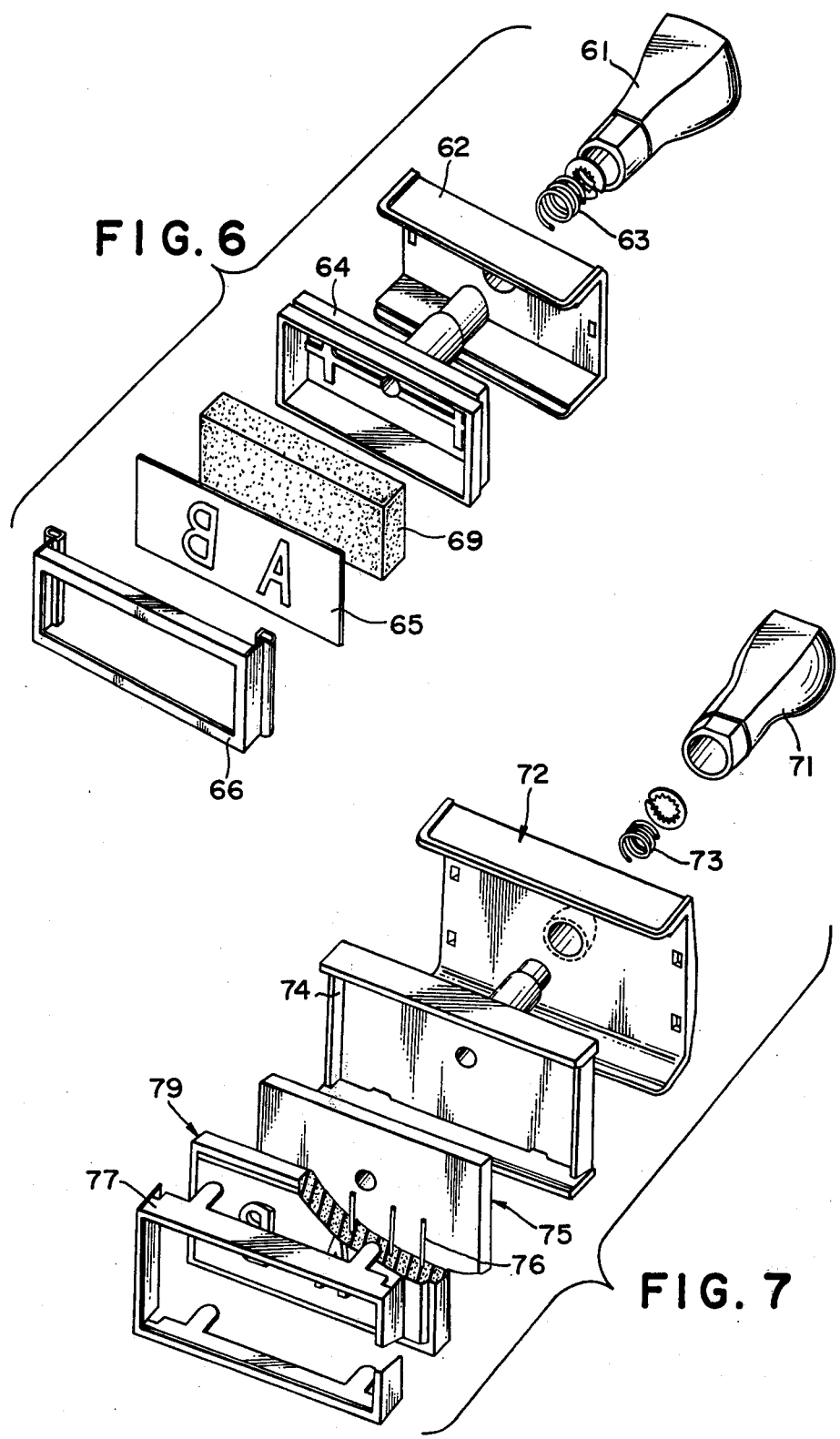

PROCESS FOR PREPARING OPEN-CELL SPONGE RUBBER PRINTING MATERIAL HAVING SMALL AND LARGE INTERCONNECTED CELLS

BACKGOUND OF THE INVENTION

The present invention relates to a process for manufacturing a printing material composed of an open-cell sponge rubber.

Printing members comprising as a printing material a sponge rubber including numerous open cells, which enable continuous stamping without use of a stamping pad, have recently been the object of active research and development.

As methods for preparing sponge rubbers having numerous open cells, which are used for such printing or stamping members, there have been known the following methods:

(1) A method in which a starting rubber is foamed by using a blowing agent alone to form numerous open cells in the rubber.

(2) A method which comprises incorporating a powder of an easily water-soluble salt together with a curing agent, a filler and the like into a starting rubber, heating and curing the rubber in the absence of a blowing agent (see FIG. 4), and removing the easily water-soluble salt powder by water washing to form numerous open cells in the rubber (see FIG. 3).

(3) A method comprising incorporating a powder of an easily water-soluble salt and a blowing agent with a curing agent and a filler into a starting rubber, heating and curing the rubber, and removing the easily water-soluble salt powder by water washing to form numerous open cells in the rubber (see FIG. 5).

These known methods involve defects and they are still insufficient in various points. For example, open cells formed according to the method (1) are not uniform, and the resulting sponge material is insufficient in ink-absorbing property and a sufficient amount of an ink cannot be absorbed and stored.

In the method (2), since particles of the powdery easily water-soluble salt incorporated in the starting rubber fall in point-contact or line-contact with one another, interconnecting passages 31 formed among cells are very narrow as shown in FIG. 3 and therefore, a highly viscous ink containing a pigment cannot be used. According to this method (2), a cell-free coating film is formed on the surface of the resulting printing material.

In the method (3), valve-like pieces 52 are formed by the blowing action of the blowing agent in cell-interconnecting passages 51 formed after washing to remove the powdery easily water-soluble salt, as shown in FIG. 5. Accordingly, the interconnecting passages 51 are very narrow and a highly viscous ink containing a pigment cannot be used. Still further, this method (3) involves a defect that a cell-free coating film is formed on the surface of the resulting printing material.

When printing materials prepared according to the methods (2) and (3) are used, if a lowly viscous ink containing a dye is used, clear prints can be obtained while continuing the printing or stamping operation for a long time. However, if known versatile inks are employed, such advantages cannot be attained at all. In other words, when pigment type inks which are bleed-proof, have a high viscosity and are excellent in water resistance and light resistance are employed, these printing materials cannot be conveniently employed and the intended effects cannot be attained at all.

The present invention contemplates providing a process for manufacturing a sponge rubber material for a printing member containing numerous open cells, which can overcome the foregoing defects involved in the conventional techniques and which can contain, absorbed therein, a highly viscous liquid ink composition in a sufficient quantity without interferring with the flowability of the ink composition.

It is therefore a primary object of the present invention to provide a process for manufacturing and open-cell sponge rubber material for a printing member which can give clear prints even if the stamping operation is continued for a long time.

Another object of the present invention is to provide a process for manufacturing a sponge rubber material for a printing member, which has numerous open cells, the sizes of which are appropriately adjusted so that a highly viscous ink containing a pigment can be effectively absorbed and can be conveniently used for printing or stamping.

Still another object of the present invention is to provide a process for preparation of sponge rubber materials that can be applied effectively to the foregoing uses.

A further object of the present invention is to provide a process for manufacturing an open-cell sponge rubber material for a printing member which comprises two integrated sponge rubber sheets differing in the cell size, in which the cell sizes are appropriately adjusted.

A still further object of the present invention is to provide a process for preparing an open-cell sponge rubber material for a printing member which comprises two integrated sponge rubber sheets differing in the cell size, in which the cell sizes are appropriately adjusted.

Other objects and advantages of the present invention will be apparent from the following description and appended claims.

SUMMARY OF THE INVENTION

The present invention relates to a printing material composed of a sponge rubber having open cells, wherein voids consist of (a) small cells having a diameter of about 0.01 mm to about 0.103 mm and (b) large cells having a diameter of about 0.149 mm to about 0.498 mm, and these cells are interconnected with one another and are distributed uniformly in the rubber substrate, and a process for the preparation of such printing material.

This sponge rubber printing material is prepared by a process comprising incorporating a fine powder of an easily water-soluble salt and a fine power of a soluble starch together with a curing agent and a filler into a starting rubber, kneading and milling the resulting mixture, introducing the kneaded and milled mixture into a mold, heating the mixture to effect curing of the rubber, removing said two fine powders by washing, and drying the resulting product.

One of the characteristic features of the present invention resides in the use of a powdery soluble starch having an appropriate particle size, whereby the defects involved in the conventional sponge rubbers for printing members, such as point and line contacts among particles of the finely divided easily water-soluble salt and narrowing of interconnecting passages among cells owing to formation of valve-like pieces, can be completely eliminated and problems regarding the impossibility of using a highly viscous, pigment-containing ink and regarding insufficient absorption of an ink can be effectively solved.

BRIEF DESCRIPTION OF THE DRAWING

FIG. 6 is a view showing an embodiment in which the sponge rubber printing material of the present invention is used as an ink pad for a stencil paper; and FIG. 7 is a diagram illustrating a holding member for a sponge rubber printing material prepared according to the present invention.

DETAILED DESCRIPTION OF THE PREFERRED EMBODIMENTS

Figure 1:
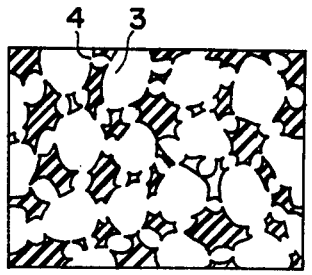
FIG. 1 is a view showing a longitudinal section of a sponge rubber material prepared according to the process of the present invention.

Starting materials that are used in the present invention will be first described.

Natural rubbers of synthetic rubbers having a molecular weight of about 10,000 to about 100,000 (corresponding to a Mooney viscosity of about 70 to about 95 as measured according to the method of JIS K-6300) are used as the starting rubber in the present invention.

As the synthetic rubber, there can be used, for example, butadiene-styrene copolymers, butadiene-acrylonitrile compolymers, chloroprene rubbers and polyurethane rubbers. Butadiene-acrylonitrile copolymers having a nitrile content of 31 to 42% are especially suitable for obtaining products excellent in oil resistance and ageing resistance, and they also are excellent in elasticity and toughness. Therefore, these copolymers are especially preferred as the starting rubber for a printing sponge rubber material.

Any of known curing agents such as sulfur, celenium, tellurium and sulfur chloride can be used as the curing agent in the present invention. The curing agent is used in an amount of about 2 to about 5 parts by weight, preferably 3 to 4 parts by weight, per 100 parts by weight of the starting rubber.

Any of known fillers such as carbon black, finely divided silicic acid, synthetic silicates and calcium carbonate can be used as the filler in the present invention. Among them, carbon black is especially preferred because it is tightly bonded to the rubber to exert a reinforcing effect. The filler is used in an amount of about 40 to about 60 parts by weight, preferably 45 to 55 parts by weight, per 100 parts by weight of the starting rubber.

The easily water-soluble compound (salt) that is used in the present invention includes crystalline inorganic compounds which can readily be finely divided, do not decompose or gasify at a rubber-curing temperature (110° to 160° C.) (which have a sufficient resistance to the curing temperature) and which can be removed with ease by washing even after exposure to the curing temperature. More specifically, there can be used such salts as sodium chloride, sodium sulfate, sodium nitrate and the like.

The particle size of the easily water-soluble compound is changed depending on the intended use. In general, however, a powdery compound having a size of 32 to 350 mesh (0.044 to 0.498 mm) is used. This size corresponds substantially to the size of cells in the resulting sponge material. In other words, this easily water-soluble compound participates in formation of large cells (b) having a size of 0.044 to 0.498 mm. The compound is used in an amount of about 200 to about 1200 parts by weight, preferably 800 to 1000 parts by weight, per 100 parts by weight of the starting rubber.

As the finely divided soluble starch that is used in combination with the finely divided easily water-soluble salt in the present invention, there can be mentioned, for example, potato starch, corn starch and rice starch. If the particle size is appropriately chosen, the source of the soluble starch is not critical in the present invention. Potato starch is excellent in solubility and a powder uniform in the particle size and having a desirable particle size can easily be obtained from potato starch. Moreover, potato starch is cheap. Accordingly, potato starch is conveniently used in the present invention. In general, the particle size of the soluble starch is adjusted so that it can pass through a 100-mesh sieve (0.01 to 0.149 mm). The soluble starch is used in an amount of about 100 to about 300 parts by weight, preferably 150 to 250 parts by weight, per 100 parts by weight of the starting rubber.

At the curing step, the soluble starch is swollen under influences of heat, and a minute amount of water contained therein is released as a gas and this gas acts as a blowing agent and makes good contribution to formation of cells. Further, the soluble starch per se is decomposed and saccharified to some extent, and the water solubility is enhanced as compared with the water solubility before heating.

In the present invention, it is preferred that the weight ratio of the soluble starch to the easily water-soluble salt be in the range of from 1:9 to 1:3, and the mixing weight ratio of about 1:4 is especially preferred. The reasons why the weight ratio of the soluble starch to the easily water-soluble salt is controlled to fall within the above-mentioned range in the present invention are as follows.

If the amount of the soluble starch is too large, large quantities of water vapor and carbon dioxide gas are formed at the heat curing step and therefore, large quantities of cells are formed and cells in the resulting sponge readily becomes non-uniform. Moreover, since decomposition of the soluble starch per se is excessively advanced, there is a fear that it may become impossible to mold the mixture to be cured in the mold. If the amount of the soluble starch is too small, particles of the soluble starch fail to be present homogeneously among particles of the easily water-soluble salt and the intended effects by incorporation of the soluble starch cannot be attained sufficiently.

In the present invention, additives customarily used in the rubber industry may be incorporated into the starting mixture. For example, effective amounts of reinforcing fillers such as carbon black, amine type ageing-preventing agents, softeners such as vaselines and plasticizers, curing assistants such as zinc white, and guanidine type curing promotors may be incorporated into the starting rubber.

The process for preparing open-cell sponge rubber printing materials according to the present invention will now be described.

The curing agent, filler, soluble starch and easily water-soluble salt having the above-mentioned particle sizes are incorporated in amounts described hereinbefore into the starting rubber, and the resulting mixture is kneaded and milled by an appropriate kneading machine.

Then, the kneaded mixture is introduced into a mold and heated and cured at a temperature of about 110° to about 160° C. for 10 minutes to 1 hour. Any of known heating means such as an electric heater and a steam heater can be used. The cured product is taken out from the mold and washed with cold or warm water under repeated compression and swelling to thereby remove the easily water-soluble salt and soluble starch from the cured product. At this washing step, the salt and starch present in the surface portion are first removed and water intrudes toward the interior of the cured product through numerous open cells in the surface portion formed by the removal of the salt and starch. In this manner, water is caused to gradually intrude into deeper portions and particles of the salt and starch are gradually removed from the interior. Finally, all the particles contained in the cured product can be completely removed. This washing treatment may be accomplished by the use of water at 20° to 30° C., but if warm water heated at 45° to 55° C. is employed, the removal of the soluble starch can be accelerated and the time required for the washing treatment can be shortened. When curing is carried out at a relatively low temperature for a relatively long time, for example, at 110° C. for 60 minutes, it is necessary to use warm water maintained at 70° C. or a higher temperature for removal of the soluble starch by washing. The reason is supposed to be that since thermal decomposition of the soluble starch is insufficient, the water solubility is not sufficiently enhanced at the curing step.

Thus, there can be obtained a sponge rubber material in which the volume of the sum of small cells (a) having a diameter of about 0.01 to about 0.103 mm and large cells (b) having a diameter of about 0.149 mm to about 0.498 mm accounts for 60 to 80% of the total volume of the sponge rubber material and the cells (a) and (b) are interconnected with one another, and in which interconnecting passages among the cells are broad and valve-like pieces narrowing interconnecting passages, which are observed in sponge rubber materials prepared according to the conventional techniques, are not present at all. It is preferred that in the so prepared sponge rubber material, the volume of the small cells (a) be 5 to 60%, particularly 5 to 40%, of the total volume of the sponge rubber material and the volume of the large cells (b) be 40 to 75%, particularly 50 to 75%, of the total volume of the sponge rubber material. According to a most preferred embodiment, the volume of the small cells (a) accounts for 5 to 20% of the total volume of the sponge rubber material and the volume of the large cells (b) accounts for 60 to 75% of the total volume of the sponge rubber material.

In accordance with another embodiment of the present invention, there is provided a sponge rubber printing material comprising an upper layer (an ink-retaining portion) and a lower layer (a printing portion), which are different from each other with respect to properties of the formed open cells. In this embodiment, the starting rubber, curing agent, filler, finely divided soluble starch and easily water-soluble salt powder to be used and the curing and washing conditions to be adopted are the same as or similar to those described hereinbefore. In this embodiment, sheets differing in the particle sizes of the easily water-soluble salt and soluble starch are prepared separately, and they are simultaneously heated and cured in the superposed state to form an integrated body.

The particle sizes of the easily water-soluble salt and soluble starch to be used for formation of these sheets are not particularly critical, but when the resulting sponge rubber material is used for a printing member using a relatively viscous ink including a pigment as a coloring material, it is preferred that for the lower printing layer, an easily water-soluble salt having a particle size of 200 to 350 mesh (0.044 to 0.074 mm) and a soluble starch having a particle size passable through a 200-mesh sieve (0.01 to 0.074 mm) be used, and that for the ink-retaining upper layer, an easily water-soluble salt having a particle size of 32 to 100 mesh (0.149 to 0.498 mm) and a soluble starch having a particle size of 100 to 250 mesh (0.062 to 0.147 mm) be used. If the particle sizes of these salt and starch are large beyond the foregoing ranges, the resulting cells are coarsened and intended uniform fine cells are not easily formed. If the particle sizes are too small, permeability or flowability of a highly viscous ink or the like is degraded.

At any rate, the most characteristic feature of the present invention resides in that a finely divided soluble starch is for the first time used for formation of a sponge rubber material, especially in combination with an easily water-soluble salt customarily used in this field. By using soluble starch, formation of gigantic agglomerates of fine particles of the easily water-soluble salt can be effectively prevented and parting of a cured product from the mold after the curing step can be remarkably facilitated. Further, particles of the soluble starch adhere around particles of the easily water-soluble salt to substantially increase the surface areas of the particles of the easily water-soluble salt. Therefore, the permeability or flowability of a highly viscous ink or the like in the resulting sponge rubber material can be remarkably enhanced over the permeability or flowability in a sponge rubber material of the same cell volume ratio prepared according to the conventional technique.

The sponge rubber material of the present invention will now be described with reference to the accompanying drawing while contrasting it to conventional products.

Figure 3:
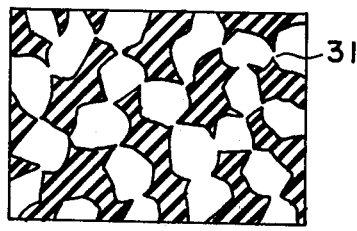
FIG. 3 is a view showing a longitudinal section of a sponge rubber material prepared according to a conventional method.
Figure 4:
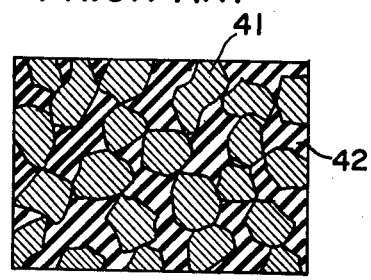
FIG. 4 is a view showing a longitudinal section of a sponge rubber material obtained according to said conventional method after the curing step but before the water washing step.

FIG. 4 is a view showing a longitudinal section of a sponge rubber material prepared according to a conventional method after the curing step but before the water washing step. In this conventional method, a powder of an easily water-soluble salt is employed. Namely, the salt is present in the form of crystalline inorganic particles 41. Such particles have a high hardness and when they are incorporated in the starting rubber 42, contacts among the particles are point contacts or line contacts. Therefore, interconnecting passages 31 formed by removal of the particles 41 by washing are narrow as shown in FIG. 3.

Figure 5:
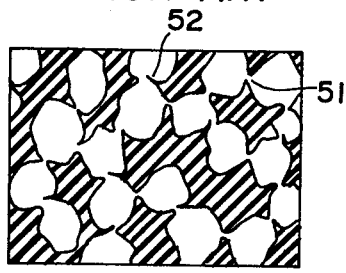
FIG. 5 is a view showing a longitudinal section of a sponge rubber material prepared according to another conventional method.

FIG. 5 is a view showing the longitudinal section of a sponge rubber material prepared according to another conventional method using a blowing agent in addition to a powder of an easily water-soluble salt. According to this method, not only narrow interconnecting passages 51 but also valve-like pieces 52 are formed in the interior of the resulting sponge rubber material, and migration of an ink is inhibited by them. Inhibition of migration is especially conspicuous when a highly viscous ink is used.

Figure 2:
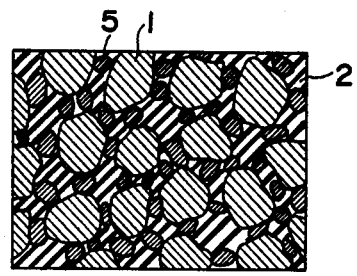
FIG. 2 is a view showing the longitudinal section of a sponge rubber material obtained according to the present invention after the curing step but before the water washing step.

In contrast, in the present invention as shown in FIG. 2, fine particles 5 of a soluble starch which is a soft organic material are interposed among particles 1 of an easily water-soluble salt incorporated in the starting rubber, and the particles of the soluble starch are readily deformed as if they were rubber balls. Accordingly, contacts among the particles 1 of the easily water-soluble salt and the particles 5 of the soluble starch are face-to-face contacts. Therefore, when these particles 1 and 5 are removed by water washing, there can be obtained a product in which open cells 3 including small cells (a) and large cells (b) are interconnected with one another through sufficiently broad interconnecting passages 4.

Moreover, since very good contact is maintained among particles, there is an advantage that the time required for removing the particles by washing can be remarkably shortened.

FIGS. 6 and 7 illustrate holding members for a sponge rubber printing material of the present invention including two integrated layers A and B.

As the highly viscous pigment-containing ink that is used for the sponge rubber printing material of the present invention, there can be mentioned, for example, an ink prepared by dispersing pigment particles having the surfaces coated with ethyl cellulose into a vehicle composed of a polyoxyalkylene castor oil prepared by modifying castor oil with an alkylene oxide, a castor oil fatty acid alkyl ester formed by modifying castor oil with an alcohol or a mixture thereof. As the alkylene oxide, there can be mentioned, for example, propylene oxide and as the castor oil fatty acid ester, there can be mentioned, for example, a castor oil fatty acid methyl ester.

Pigments having a particle size of 0.01 to 0.1μ are ordinarily used for formation of such highly viscous pigment-containing inks. Particulate pigments having the surfaces coated with ethyl cellulose (for example, those manufactured and sold under the tradename "Microlith" by Ciba Geigy) are preferably employed. For example, the following pigments are chosen and used depending on the intended color:

| | |
|---|---|
| Scarlet: | condensed azo compound (Color Index: Pigment Red 166) |
| Yellow: | diarylide-dimethyldichloroanilide (Color Index: Pigment Yellow 83) |
| Black: | carbon black |
| Blue: | beta phthalocyanine (Color Index: Pigment Blue 15.3) |
| Green: | halogenated copper phthalocyanine (Color Index: Pigment Green 7) |
| Violet: | dioxazine (Color Index: Pigment Violet 37) |

The sponge rubber printing material of the present invention may be used not only for the abovementioned printing member using a pigment type ink having a relatively high viscosity but also for a stamp pad, an ink pad and an inking roller. When the sponge rubber material of the present invention is applied to these uses, a sufficient quantity of an ink can be absorbed and retained therein and clear prints can be obtained. Still in addition, the sponge rubber material of the present invention can be used as a shock-absorbing material, a filler, a sanitary material and the like in various fields.

The present invention will now be described in detail by reference to the following Examples but by no means limit the scope of the invention.

EXAMPLE 1

In 100 parts by weight of a synthetic rubber (NBR) were incorporated 3.5 parts of sulfur, 5 parts of zinc white, 5 parts by weight of a curing promotor (diphenyl guanidine), 30 parts by weight of a softener comprising a liquid rubber (low-molecular-weight NBR), vaseline and dibutyl phthalate (DBP), 50 parts by weight of carbon black, 2 parts by weight of an ageing-preventing agent (phenyl-β-naphthylamine), 800 parts of a fine powder of sodium chloride or sodium sulfate having a size of 80 to 100 mesh (0.149 to 0.176 mm) and 200 parts by weight of a fine powder of soluble potato starch having a size of 150 to 250 mesh (0.062 to 0.103 mm), and the mixture was kneaded and milled. The mixture was introduced into a mold by using a roll and the mixture was pressed between hot plates. Thus, the mixture was heated at 150° C. for 15 minutes to effect curing. The cured product was separated from the mold and washed with water sufficiently to remove sodium chloride or sodium nitrate and soluble potato starch. Then, the cured product was dehydrated and dried to obtain an inking roller. A highly viscous pigment-containing ink having a viscosity of 2000 to 4000 cp as measured at 25° C. was absorbed in this inking roller, and when the resulting inking roller was used in an automatic ticket vending machine, clear printed tickets free of bleeding or blurring could be obtained for a long time because the ink was sufficiently absorbed in good conditions.

EXAMPLES 2 TO 4

In the same manner as described in Example 1, a stamp pad, an ink pad for a check writer and a shock-absorbing material were prepared from compositions indicated in Table 1. Each of them had very good properties. Thus, it was confirmed that the sponge rubber material of the present invention can be used effectively in various fields.

FIG. 6 illustrates an embodiment in which the ink pad prepared in Example 3 is used as an ink pad for a stencil paper. In FIG. 6, reference numerals 61, 62, 63, 64, 69, 65 and 66 represent a handle, a cover, a spring, a printing letter case, the ink pad prepared in Example 3, a stencil paper and a stencil paper pressing frame, respectively.

Table 1

| Starting Material (parts by weight) | Example 2 | Example 3 | Example 4 |
|---|---|---|---|
| Starting rubber | 100 | 100 | 100 |
| Sulfur | 2 | 2.2 | 2 |
| Zinc white | 5 | 5 | 5 |
| Curing promotor (diphenyl guanidine) | 3 | 3 | 3 |
| Softener | | | |
| Vaseline | 5 | 5 | 5 |
| Liquid rubber | 15 | — | 15 |
| DBP | 16 | 10 | 13 |
| Carbon black | 50 | 55 | 55 |
| Ageing-preventing agent (phenyl-β-naphthylamine) | 2 | 2 | 2 |
| Sodium chloride | 800 | 800 | 800 |

Table 1-continued

| Starting Material (parts by weight) | Example 2 | Example 3 | Example 4 |
| --- | --- | --- | --- |
| (100–250 mesh) | | | |
| Soluble starch | 200 | 200 | 200 |
| (100–250 mesh) | | | |
| Thickness (mm) of Sheet | 7 | 6 | 6 |
| Use | stamp pad | ink pad for check writer | shock-absorbing material |

EXAMPLE 5

In 100 parts by weight of a synthetic rubber (NBR) were incorporated 3.5 parts by weight of sulfur, 5 parts by weight of zinc white, 5 parts by weight of a curing promotor (diphenyl guanidine), 30 parts by weight of a softener comprising a liquid rubber (low-molecular-weight NBR), vaseline and DBP, 50 parts by weight of carbon black, 2 parts by weight of an ageing-preventing agent (phenyl-$\beta$-naphthylamine), 800 parts by weight of sodium chloride, sodium sulfate or sodium nitrate having a size of 200 to 350 mesh (0.044 to 0.074 mm) and 200 parts by weight of soluble potato starch having a size passable through a 200 mesh-sieve (0.01 to 0.074 mm), and the mixture was kneaded and milled and formed into a thin sheet having a thickness of 2 mm (this sheet is designated as "sheet A"). Separately, 800 parts by weight of sodium chloride, sodium sulfate or sodium nitrate having a size of 32 to 100 mesh (0.147 to 0.498 mm) and 200 parts by weight of soluble potato starch having a size of 100 to 250 mesh (0.062 to 0.149 mm) were incorporated in the same rubber compound as described above, and the mixture was kneaded and milled and formed into a relatively thick sheet having a thickness of 5 mm (this sheet is designated as "sheet B"). The sheet B was superposed on the sheet A and the assembly was introduced into a mold having letters or patterns engraved on the inner bottom face. Then, the sheet assembly was pressed between hot plates under a pressure of about 200 Kg/cm$^2$ while the sheet A was pressed into the engraved letters on the inner bottom face of the mold, and curing was conducted at 150° C. for 15 minutes. After the curing operation, the cured product was separated from the mold, and it was sufficiently washed with water until the sodium chloride, sodium sulfate or sodium nitrate and the potato starch were completely removed. The cured product was dehydrated and dried to obtain a rubber stamp.

The so prepared rubber stamp had an integrated structure of the sheets A and B. A printing member including the so prepared rubber stamp is illustrated in FIG. 7. Referring to FIG. 7, the rubber stamp 79 comprising the integrated sheets A and B is attached to a holding member capable of storing an ink therein so that the printing surface having letters or patterns is located below. Thus, a highly viscous pigment-containing ink having a viscosity of 2000 to 4000 cp as measured at 25° C., which is stored in the holding member, is impregnated into the sheet assembly from the side of the sheet B. Since the upper layer portion (namely, the portion of the sheet B) has a structure in which fine open cells are interconnected with one another in a very complicated and random manner, a large quantity of the ink can be absorbed in this upper layer portion, and this absorbed ink gradually permeates into the lower layer portion (the portion of the sheet A) and finally up to the printing surface. Accordingly, when the printing surface is lightly pressed on a paper or the like, clear letters or patterns are printed on the paper or the like. The printing portion including numerous fine open cells connected with one another through broad interconnecting passages. Therefore, when the printing member is lightly pressed on a paper or the like, a small amount of the highly viscous ink necessary for printing is allowed to ooze out uniformly, intricate letters or patterns can be clearly printed on the paper or the like. Further, the ink is always permeated into the lower layer from the upper layer and the ink is absorbed in numerous cells interconnected with one another through broad interconnecting passage to such an extent that the ink is not excessively absorbed in the lower portion. This printing member, therefore, can be used over a long period of time without supply of a fresh ink. It is presumed that since open cells are interconnected with one another through relatively broad interconnecting passages, even if an ink containing a pigment as the coloring material and having a relatively high viscosity is used, by virtue of the capillary phenomenon the ink is allowed to ooze out in good condition.

In the foregoing embodiment, letters or patterns are formed on the printing surface while the sheet assembly is in the mold. In the present invention, such letters or patterns may be formed by engraving the cured product.

In FIG. 7, reference numerals 71, 72, 73, 74, 75, 79, 76 and 77 represent a handle, a cover, a spring, a printing letter holder, an ink-absorbing member, the rubber stamp prepared in this Example, a rod reinforcing the rubber stamp 79 and a frame preventing the rubber stamp 79 from falling down.

EXAMPLES 6 AND 7

In the same manner as described in Example 5, a stamp pad and an ink pad for a check writer were prepared from the compositions indicated in Table 2. These pads had very good properties.

Table 2

| Starting Material (parts by weight) | Example 6 | | Example 7 | |
| --- | --- | --- | --- | --- |
| | Sheet A | Sheet B | Sheet A | Sheet B |
| Starting rubber | 100 | 100 | 100 | 100 |
| Sulfur | 2 | 2 | 2.2 | 2.2 |
| Zinc white | 5 | 5 | 5 | 5 |
| Curing promotor (diphenyl guanidine) | 5 | 5 | 5 | 5 |
| Softener | | | | |
| Vaseline | 5 | 5 | 5 | 5 |
| Liquid rubber | 15 | 15 | — | — |
| DBP | 16 | 18 | 10 | 10 |
| Carbon black | 50 | 50 | 55 | 55 |
| Ageing-preventing agent (phenyl-$\beta$-naphthyl-amine) | 2 | 2 | 2 | 2 |

Table 2-continued

| Starting Material (parts by weight) | Example 6 Sheet A | Example 6 Sheet B | Example 7 Sheet A | Example 7 Sheet B |
| --- | --- | --- | --- | --- |
| Sodium chloride | 800 (200–350 mesh) | 800 (32–100 mesh) | 800 (200–350 mesh) | 800 (32–100 mesh) |
| Soluble starch | 200 (200 mesh pass) | 200 (100–250 mesh) | 200 (200 mesh pass) | 200 (100–250 mesh) |
| Thickness (mm) of sheet | 2 | 5 | 2 | 4 |
| Use | Stamp pad | | Ink pad for check writer | |

What is claimed is:

1. In process for preparing a sponge rubber printing material having numerous open cells which comprises mixing a starting rubber material, a curing agent, a filler and a material for forming cells, introducing the resulting mixture into a mold, heating the mixture to effect curing and then washing the cured product to remove cell formers, the improvement comprising using a combination of a finely divided soluble starch having a particle size within the range of from 0.01 to 0.103 mm to form small open cells (a) and a fine powder of a readily water-soluble salt selected from the group consisting of sodium chloride, sodium sulfate, sodium nitrate, and mixtures thereof, having a particle size within the range of from 0.149 to 0.498 mm to form large open cells (b) as the material for forming cells, the amount of the starch being 200 to 1200 parts by weight of the starting rubber and the ratio of the amount of starch to readily water-soluble salt being in the range of from 1:9 to 1:3, whereby the said small and large open cells (a) and (b) are uniformly distributed throughout the rubber substrate in a state wherein said small and large open cells (a) and (b) are interconnected with one another through interconnecting passages free from obstruction.

2. A process for the preparation of sponge rubber printing materials according to claim 1 wherein the starting rubber is a butadiene-acrylonitrile copolymer.

3. In a process for preparing a sponge rubber printing material having numerous open cells which comprises separately forming two different raw rubber sheet compositions by kneading and milling a mixture containing a starting rubber, a curing agent, a filler, and a material for forming open cells, molding the resulting two sheets in a tightly superposed state, curing the superposed sheets, and washing the cured product to remove the materials for forming open cells, the improvement comprising using a combination of a soluble starch and fine powder of a readily water-soluble salt selected from the group consisting of sodium chloride, sodium sulfate, sodium nitrate and mixtures thereof, the amount of the starch being 200 to 1200 parts by weight of the starting rubber, the ratio of the amount of starch to the water-soluble salt being in a range of from about 1:9 to 1:3, and the particle size of said salt and said starch being from about 0.01 to 0.103 mm for one of the sheets, and being from about 0.149 to 0.498 mm for the other of the sheets.

* * * * *